US012463832B2

(12) United States Patent
Webster et al.

(10) Patent No.: US 12,463,832 B2
(45) Date of Patent: Nov. 4, 2025

(54) RENEWING OF DIGITAL IDENTITY DOCUMENTS (71) Applicant: THALES DIS FRANCE SAS, Meudon (FR)

(72) Inventors: Michael Webster, Vantaa (FI); Martin David, Prague (CZ); Thomas Schalldach, Buštehrad (CZ); Gérald Maunier, Sanary-sur-Mer (FR)

(73) Assignee: THALES DIS FRANCE SAS, Meudon (FR)

( * ) Notice: Subject to any disclaimer, the term of this patent is extended or adjusted under 35 U.S.C. 154(b) by 270 days.

(21) Appl. No.: 17/912,899

(22) PCT Filed: Mar. 29, 2021

(86) PCT No.: PCT/EP2021/058091
§ 371 (c)(1),
(2) Date: Sep. 20, 2022

(87) PCT Pub. No.: WO2021/198143
PCT Pub. Date: Oct. 7, 2021

(65) Prior Publication Data
US 2023/0171113 A1 Jun. 1, 2023

(30) Foreign Application Priority Data

Apr. 3, 2020 (EP) .................................... 20315105

(51) Int. Cl.
H04L 9/32 (2006.01)
H04L 9/08 (2006.01)

(52) U.S. Cl.
CPC ............ H04L 9/3268 (2013.01); H04L 9/088 (2013.01); H04L 9/3247 (2013.01)

(58) Field of Classification Search
CPC ..... H04L 9/3268; H04L 9/088; H04L 9/3247; H04L 9/3234
(Continued)

(56) References Cited

U.S. PATENT DOCUMENTS 9,130,758 B2 * 9/2015 Fu ........................ H04L 63/0823
9,544,308 B2 * 1/2017 Minter ................... G06V 40/70
(Continued)

OTHER PUBLICATIONS

International Search Report (PCT/ISA/210) and Written Opinion (PCT/ISA/237) mailed on Jun. 16, 2021, by the European Patent Office as the International Searching Authority for current International Application No. PCT/EP2021/058091—[13 pages].

Primary Examiner — Taghi T Arani
Assistant Examiner — Pegah Barzegar (57) ABSTRACT Provided is a method for facilitating the renewing of a digital identity document. It includes receiving a request for renewing a digital identity document; checking whether said digital identity document can be renewed, if the check result is positive, creating an up-to-date validity-related data item to be associated with said digital identity document and to be inspected by a verifier when the validity of said digital identity document must be assessed; and sending said up-to-date validity-related data item to a device of a user of said digital identity document so that a validity-related data item previously associated with said digital identity document can be replaced by said up-to-date validity-related data item at the user's side.

15 Claims, 1 Drawing Sheet (58) Field of Classification Search
USPC .......................................................... 713/156
See application file for complete search history.

(56) References Cited

U.S. PATENT DOCUMENTS

| | | | | |
|---|---|---|---|---|
| 10,033,536 | B2* | 7/2018 | Mercury | H04L 63/0823 |
| 10,210,510 | B1* | 2/2019 | Brandwine | G06Q 20/38215 |
| 11,410,182 | B2* | 8/2022 | Dokai | G06Q 30/018 |
| 11,610,196 | B1* | 3/2023 | Laureano | G06F 21/45 |
| 12,063,314 | B1* | 8/2024 | Goeringer | H04L 9/3226 |
| 2002/0100802 | A1* | 8/2002 | Sehr | G06Q 20/355 |
| | | | | 235/384 |
| 2006/0016107 | A1* | 1/2006 | Davis | H04L 9/3231 |
| | | | | 40/124.01 |
| 2008/0027761 | A1* | 1/2008 | Bracha | G06Q 40/00 |
| | | | | 705/4 |
| 2009/0192943 | A1* | 7/2009 | Dubhashi | H04L 9/3247 |
| | | | | 705/59 |
| 2011/0113239 | A1* | 5/2011 | Fu | H04L 63/0823 |
| | | | | 713/156 |
| 2013/0160102 | A1* | 6/2013 | Decara | G06F 21/6218 |
| | | | | 726/7 |
| 2015/0207789 | A1* | 7/2015 | Kumar | H04L 63/08 |
| | | | | 726/6 |
| 2017/0148014 | A1* | 5/2017 | Bouse | G06Q 20/40145 |
| 2017/0279614 | A1* | 9/2017 | Mercury | H04L 63/083 |
| 2018/0034646 | A1* | 2/2018 | Kuramoto | H04L 9/3268 |
| 2018/0189605 | A1* | 7/2018 | Wu | G06K 19/077 |
| 2019/0190718 | A1* | 6/2019 | Wease | H04L 9/3242 |
| 2020/0322157 | A1* | 10/2020 | Wease | H04L 9/3247 |
| 2020/0412552 | A1* | 12/2020 | Pekarske | H04L 9/3268 |
| 2021/0051028 | A1* | 2/2021 | Kapon | H04L 63/0823 |
| 2023/0171113 | A1* | 6/2023 | Webster | H04L 9/3247 |
| | | | | 713/156 |
| 2023/0214502 | A1* | 7/2023 | Hadi | H04L 9/0866 |
| | | | | 726/30 |
| 2024/0283660 | A1* | 8/2024 | Gujar | H04L 9/3239 |

\* cited by examiner

RENEWING OF DIGITAL IDENTITY DOCUMENTS

TECHNICAL FIELD

The present invention relates generally to identity documents, and more particularly to renewing digital identity documents in a more efficient manner that allows reducing the burden on issuers of the digital identity documents.

BACKGROUND

It is known that, institutions or authorities, such as government agencies (e.g., department of motor vehicles), issue identity cards or documents which may be used to identify a person or verify aspects of a person's personal identity. Identity document may include, for example, a driver's license, a fishing license, a hunting license, a passport, a health insurance card, a firearm owner's identification card, a boating license, a commercial driver's license, etc. Identity documents also give permission to perform certain activities, like driving or fishing and under which circumstances the identified person is allowed to do so.

Currently, there is a trend for the issuing authorities to issue digital identity documents.

A digital identity document is an electronic form of the physical identity document. It is issued to a device (e.g., mobile phone, smart car) from where it can be used, both online and offline.

In order to enhance the reliability of the digital identity document, especially as it can be used offline and there may be insufficient means for checking if it is valid or not (e.g., expired, revoked), the digital identity document has a very short validity period and must be frequently renewed.

In the current state of the art, in order to renew a digital identity document, full data preparation of the digital identity document must be performed. In other words, each time the digital identity document needs to be renewed, basically the same process as for its issuance (or production) needs to be performed all over again by an issuer of the digital identity document, for example, retrieving properties (e.g. personal data of a user, data related to the issuer, data about what activities the document allows the user to do, and under which circumstances, etc.) to be used in the document, calculating derived values (e.g. hashes, signatures) of the received properties, etc. Each time the digital identity document is renewed, the whole digital identity document needs to be generated and transmitted to the user so that the user can download it in his/her device (e.g. mobile phone).

Consequently, the renewing mechanism of the prior art greatly increases the load on traditional IT systems of the issuing authorities, which normally issue physical documents that are valid for years or decades and may lack sufficient capabilities of frequently renewing digital identity documents which have a very short validity period.

The current renewal mechanism also limits the issuing authorities to delegate the renewal tasks to service providers which have more powerful IT capabilities, because the service providers are often constricted by regulations in terms of collecting personal data.

Even if the issuing authorities delegates the renewal tasks to particular authorized service providers, the IT capabilities of the service providers may be importantly affected by the heavy renewing process of the prior art. Thus, even these service providers may not guaranty an efficient renewing of the digital identity documents facing with the frequent renewal requirements.

Hence, the current process in renewing digital identity documents is subject to several drawbacks.

SUMMARY

In order to solve the above mentioned technical problem, the present invention provides a lightweight renewal mechanism for digital identity documents which allows renewing the digital identity documents in a more efficient manner and thus enables to reduce the burden on issuers of the digital identity documents.

In a particular embodiment of the present invention, a method for facilitating the renewing of a digital identity document comprises the following steps of:
  receiving by a renewal system a request for renewing a digital identity document from a device of a user of the digital identity document or a device of a verifier needing to inspect the digital identity document;
  checking by the renewal system whether the digital identity document can be renewed;
  if the check result is positive, creating by the renewal system an up-to-date validity-related data item to be associated with the digital identity document and to be inspected by a verifier when the validity of said digital identity document must be assessed;
  sending by the renewal system the up-to-date validity-related data item to a device of a user of the digital identity document;
  receiving by the device of the user of the digital identity document the up-to-date validity-related data item from the renewal system (103); and
  replacing by the device of the user of the digital identity document a validity-related data item previously associated with the digital identity document with the up-to-date validity-related data item at the user's side.

In a particular embodiment of the present invention, the validity-related data item is a data item outside the digital identity document.

In a particular embodiment of the present invention, the method further comprises:
  including a creation date of the up-to-date validity-related data item in the up-to-date validity-related data item,
  wherein the digital identity document comprises a renewing policy, and wherein the creation date and the renewing policy are suitable to be inspected by the verifier in order to determine whether the digital identity document is outdated.

In a particular embodiment of the present invention, the renewing policy is a predetermined duration.

In a particular embodiment of the present invention, the method further comprises:
  providing up-to-date expiration information of said up-to-date validity-related data item in said up-to-date validity-related data item In a particular embodiment of the present invention, the method further comprises:
  providing a certificate of a creator of the up-to-date validity-related data item in the up-to-date validity-related data item,
  wherein the digital identity document comprises a reference to an allowed creator of the up-to-date validity-related data item.

In a particular embodiment of the present invention, the digital identity document comprises a certificate of a Certificate Authority, and the certificate of the creator of the validity-related data item is signed by the Certificate Authority.

In a particular embodiment of the present invention, data included in the up-to-date validity-related data item is signed by a creator of the up-to-date validity-related data item.

In a particular embodiment of the present invention, the up-to-date validity-related data item is a data component of the digital identity document, the method further comprising:

providing up-to-date expiration information of the digital identity document in the up-to-date validity-related data item.

In a particular embodiment of the present invention, the number of the validity-related data items is more than one, each validity-related data item comprising expiration-related information.

In a particular embodiment of the present invention, the method further comprises:

calculating a derived value of the up-to-date validity-related data item by using a derivation function;

signing said derived value and derived values of other data components of the digital identity document as a signed data object;

sending the signed data object to the user.

In a particular embodiment of the present invention, a system comprises:

a renewal system configured to:

receive a request for renewing a digital identity document from a device of a user of the digital identity document or a device of a verifier needing to inspect the digital identity document;

check whether the digital identity document can be renewed;

if the check result is positive, create an up-to-date validity-related data item to be associated with the digital identity document and to be inspected by a verifier when the validity of the digital identity document must be assessed;

send the up-to-date validity-related data item to a device of a user of the digital identity document;

the device of the user of the digital identity document configured to:

receive the up-to-date validity-related data item from the renewal system;

replace a validity-related data item previously associated with the digital identity document with the up-to-date validity-related data item at the user's side.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

The advantages and features of the system and the computer program according to the embodiments of the present invention are the same with those of the above described method and will not be repeated here.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present invention comprises a method, system and computer program product for renewing digital identity documents. In one embodiment of the present invention, a system, referred to herein as a "digital identity document renewal system," receives a request for renewing a digital identity document. A "digital identity document," as used herein, refers to a document or card that is used to identify a person or verify aspects of a person's personal identity in digital form. Furthermore, a "digital identity document," as used herein, refers to a document in digital form that lists the identity attribute(s) (e.g., age) and/or identity document type(s) (e.g., driver's license) that a verifier has authority to verify/challenge/request. Examples of properties may include identity attributes (e.g., name, age, eye color, address, etc.), a document type (e.g., driver's license, fishing license, hunting license, passport, health insurance card, firearm owner's identification card, boating license, commercial driver's license, etc.), document attributes (e.g., document number, issuing date, expiration date, etc.), issuer attributes (e.g., issuer name, address, etc.), alternate views for displaying the digital identity document, an acquisition uniform resource locator (URL) and possibly service URL(s) (e.g., renewal service), a renewal service provider reference, a verifier reference, permissions or restrictions about how the document may be used (e.g. a license can be marked that the owner must separately provide a medical certificate, wear spectacles), etc.

After receiving the request for renewing the digital identity document, the system creates an up-to-date validity-related data item. A "validity-related data item," as used herein, refers to a data item (e.g., freshness token, expiration-related data group) to be associated with (e.g., used together with, integrated within) the digital identity document (e.g. driver's license stored in the user's mobile phone). Furthermore, a "validity-related data item," as used herein, refers to a data item to be inspected by a verifier to verify the validity (e.g., expired, revoked) of the associated digital identity document. An "up-to-date validity-related data item," as used herein, refers to a data item containing updated validity-related information (e.g., updated creation date of a freshness token, updated expiration-related information of a freshness token, updated expiration-related information of an expiration-related data group) that is ready (or appropriate) to use by a verifier to check the validity of the associated digital identity document. By contrast, an "outdated validity-related data item," as used herein, refers to a data item containing outdated validity-related information (e.g., outdated creation date of a freshness token, outdated expiration-related information of an expiration-related data group) that is not suitable to use by a verifier to check the validity of the digital identity document associated with the data item.

The system may then send the created up-to-date validity-related data item to the user so that a validity-related data item (e.g., outdated freshness token, outdated expiration-related data group) previously associated with (e.g., used together with, integrated within) the digital identity document (e.g., driver's license stored in the user's mobile phone) is replaced by the up-to-date validity-related data item at the user's side (e.g., in the user's mobile phone).

As discussed herein, the principles of the present invention allow a digital identity document to be renewed in a lightweight manner so as to reduce the load on the IT systems of the issuing institutions (e.g., government agencies such as department of motor vehicles, issuing/renewal service providers, etc.). The present invention enables to perform the renewing process independently of the issuing process by independently creating (or renewing) a validity-related data item (i.e., which is suitable to be associated with the digital identity document at the user's side) without re-issuing (or regenerating) the whole digital identity document at the issuer (or renewal system)'s side. In this way, the issuer's burden is greatly reduced. Also, the present invention allows the issuing institutions (e.g., government agencies) to delegate the renewal tasks to renewal service providers with minimum citizen privacy leakage risks. Furthermore, the delay for renewing the digital identity document may be decreased thanks to the lightweight renewal process of the invention. By saving time and resources in the new renewing process, the present invention thus meets the frequent renewing requirements imposed by the more and more challenging security environments in our society.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
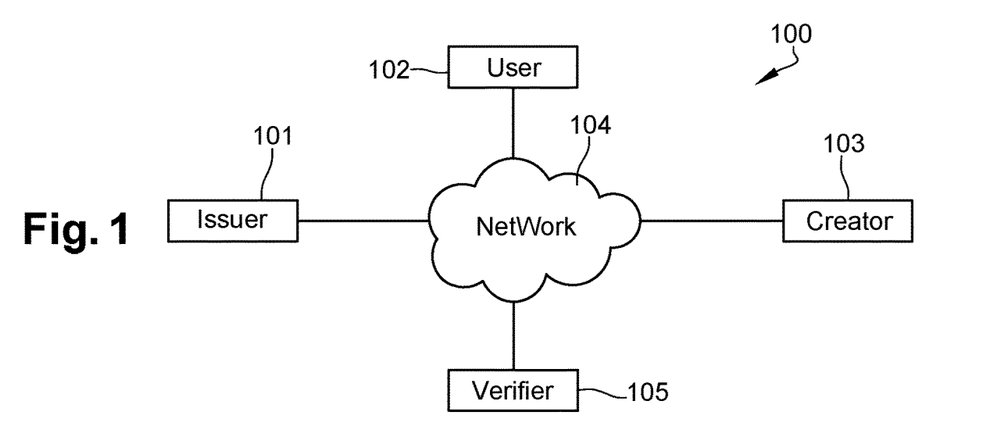
FIG. 1 illustrates a system for facilitating the renewing of digital identity documents in accordance with an embodiment of the present invention.

Referring now to the Figures in detail, FIG. 1 illustrates a system 100 for renewing digital identity documents in accordance with an embodiment of the present invention. A "digital identity document," as used herein, refers to a document or card that is used to identify a person or verify aspects of a person's personal identity in digital form and what they are allowed to do (e.g., Driving license gives permission to operate a certain class of vehicle, Fishing license gives permission to fish in a boat). Examples include, but not limited to, a driver's license, a fishing license, a hunting license, a passport, a health insurance card, a firearm owner's identification card, a boating license, a commercial driver's license, etc.

As illustrated in FIG. 1, system 100 includes an issuer 101, such as a government agency (e.g., department of motor vehicles), that is responsible for issuing a digital identity document based on data stored on secured servers/databases (not shown in FIG. 1) accessible by issuer 101. Such data for digital identity documents issued to users 102 may include personal data of users, such as name, address, birthdate, height and eye color. The principles of the present invention are not to be limited in scope to particular types of identity documents or the data stored in such identity documents. The principles of the present invention are to include any type of identity document that is used for identifying a person/a system (e.g., smart car) or verifying aspects of a person's personal identity/permitted activities regardless of the type of data in the identity document.

When issuer 101 issued the digital identity document, a validity-related data item is created by issuer 101 for the digital identity document. This validity-related data item may be, for example, a freshness token that is externally associated with (e.g., created outside but used together with) the digital identity document, or an expiration-related data group internally associated with (e.g., created inside) the digital identity document, or any other forms of data structure suitable to be associated with the digital identity document.

Furthermore, the validity-related data item is configured to contain information to be used, e.g., by verifier 105, to determine the validity of the digital identity document associated with the validity-related data item. In one embodiment (to be further discussed below), a freshness token contains a date on which the freshness token is created, and the associated digital identity document comprises a renewing policy (e.g., a predetermined duration during which the freshness token does not need to be renewed). Based on the creation date and the renewing policy, verifier 105 is able to determine whether the freshness token is outdated and thus whether the associated digital identity document is outdated (or has expired). Alternatively, a freshness token may simply contain expiration-related information such as an expiration date of the freshness token. When an up-to-date freshness token is created by renewal system 103, the expiration—related information needs to be updated correspondingly (e.g., by indicating a new expiration date of the freshness token). In another embodiment (to be further discussed below), an expiration-related data group may include, but not limited to, for example, a Data Group 1 (DG1) (containing Date of Expiry) according to the International Organization for Standardization (or ISO) 18013 part 5; a Data Group 1 (DG1) according to the ISO 18013 part 3, a DG31 (containing Time of last update), a DG32 (containing Mobile Driver's License (or mDL) data validity date), and a DG33 (containing Expected next update date) according to the ISO Digital Driver's License standard draft. Such an expiration-related data group is a data component of the digital identity document and may be read by verifier 105 to determine whether the digital identity document has expired.

When issuer 101 issued the digital identity document to user 102, the validity-related data item (e.g., freshness token, expiration-related data group) originally created by issuer 101 was sent to user 102 together with the digital identity document (in the case of the freshness token) or within the digital identity document (in the case of the expiration-related data group). Then, the validity-related data item is stored in a terminal (e.g., mobile phone) of user 102 together with the digital identity document (in the case of the freshness token) or within the digital identity document (in the case of the expiration-related data group). The validity-related data item is configured to be replaceable by another validity-related data item (e.g., the up-to-date validity-related data item) that is later created by a digital identity document renewal system 103, e.g., when the digital identity document renewal system 103 receives a renewing request.

System 100 further includes a user computing device 102 (the user's computing device as well as the user himself/herself may each be identified with element number 102) connected to issuer 101 and a digital identity document renewal system 103 via a network 104. Computing device 102 may be any type of computing device (e.g., portable computing unit, Personal Digital Assistant (PDA), smartphone, laptop computer, mobile phone, smart car, navigation device, game console, desktop computer system, workstation, Internet appliance and the like) configured with the capability of connecting to network 104 and consequently communicating with issuer 101 and digital identity document renewal system 103 as discussed herein.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a digital identity document renewal system 103 (the digital identity document renewal system as well as the creator of the up-to-date validity-related data item may each be identified with element number 103). Digital identity document renewal system 103 is configured to receive requests sent by, e.g., user 102 and/or issuer 101 and/or verifier 105, for renewing digital identity documents. The digital identity document renewal system 103 may include, but not limited to, a system of issuer 101, or a system of a renewal service provider. In other words, the digital identity document renewal system 103 may be, for example, owned by issuer 101 or the renewal service provider. The requests, such as those sent by a computing device of user 102 or issuer 101 or verifier 105, may comprises document references or numbers or any other identifiers that enable the digital identity document renewal system 103 to identify the digital identity documents for which the renewals are requested.

The digital identity document renewal system 103 is configured to check whether the identified digital identity documents can be renewed, e.g., whether the identified digital identity documents have been revoked. The digital identity document renewal system 103 may perform this check based on data stored in secure servers/databases accessible by the digital identity document renewal system 103. These secure servers/databases may be managed by issuer 101. Example of such servers/database may include standard certificate management techniques like CRLs (Certificate Revocation Lists) or OCSP (Online Certificate Status Protocol) servers, or proprietary APIs allowing digital identity document renewal system 103 to interrogate issuer about a given document validity. Issuer 101 may also push revoked/expired document identifiers to digital identity document renewal system 103 when their status is changing, just in time or in batch mode.

The digital identity document renewal system 103 is configured to, if it is checked (e.g., with issuer 101) that the identified digital identity documents can be renewed (e.g., not revoked), create an up-to-date validity—related data item for the digital identity document. This up-to-date validity—related data item is to replace a validity-related data item that issuer 101 created for the digital identity document when issuer 101 issued the digital identity document. Alternatively, the up-to-date validity-related data item is to substitute a validity-related data item previously created by digital identity document renewal system 103. The up-to-date validity-related data item has the same type as the validity-related data item originally issued by issuer 101. The up-to-date validity-related data item may be, for example, a freshness token that is externally associated with (e.g., created outside but used together with) the digital identity document, or an expiration-related data group internally associated with (e.g., created inside) the digital identity document, or any other data structures suitable to be associated with the digital identity document.

Furthermore, the up-to-date validity-related data item has the same function of the validity-related data item originally created by issuer 101, i.e., it is configured to contain information to be used, e.g., by verifier 105, to determine the validity of the digital identity document associated with the up-to-date validity-related data item. In one embodiment (to be further discussed below), the created up-to-date freshness token to be sent to user 102 contains a date on which this freshness token is created, and the digital identity document to be associated with the up-to-date freshness token at the user's side comprises a renewing policy (e.g., a duration during which the freshness token does not need to be renewed). Based on the creation date and the renewing policy, verifier 105 is able to determine whether the freshness token is up-to-date in view of the current date and thus determine whether the associated digital identity document is outdated (or has expired). In another embodiment (to be further discussed below), the created up-to-date expiration-related data group may be a data group corresponding to the expiration-related data group originally created by issuer 101. The up-to-date expiration-related data group may include, but not limited to, for example, a Data Group 1 (DG1) (containing Date of Expiry) according to the International Organization for Standardization (or ISO) Driver's License standard draft; a DG31 (containing Time of last update), a DG32 (containing Mobile Driver's License (or mDL) data validity date), and a DG33 (containing Expected next update date) according to the ISO Digital Driver's License standard draft. The up-to-date expiration-related data group is to be read by verifier 105 to determine whether the digital identity document has expired.

The validity-related data item created by the digital identity document renewal system 103 is considered as "up-to-date" because data (e.g. creation date, Date of Expiry, Time of last update, mDL data validity date, Expected next update date) contained in the validity-related data item is the latest information. For example, the creation date of the freshness token is the current date, the expiration-related information (e.g., Date of Expiry) included by the digital identity document renewal system 103 in the expiration-related data group is currently obtained from a secure server/database (not shown in the figures) accessible by the digital identity document renewal system 103. The secure servers/database may be managed by issuer 101 or renewal service provider.

Furthermore, the digital identity document renewal system 103 is configured to send the created up-to-date validity-related data item to user 102 so that the validity-related data item previously (or originally) associated with the digital identity document (e.g., the freshness token or the expiration-related data group originally issued by issuer 101) can be replaced by the up-to-date validity-related data item at the user's side (e.g., in the mobile phone of user 102). Since the digital identity document renewal system 103 creates and sends the up-to-date validity-related data item independently of the digital identity document, the digital identity document renewal system 103 is able to perform a lightweight and rapid renewing process which does not require re-issuing (or regenerating) the whole digital identity document.

These and other features of digital identity document renewal system 103 will be discussed further below. In one embodiment, digital identity document renewal system 103 provides the services of renewing a digital identity document requested by user 102 or issuer 101 as a cloud service. The renewing mechanism may be, alternatively, performed in a virtual machine (or VM). A hardware configuration of digital identity document renewal system 103 is discussed below in connection with FIG. 2.

Furthermore, as illustrated in FIG. 1, a verifier computing device 105 (the verifier's computing device as well as the verifier himself/herself may each be identified with element number 105) is connected to network 104 to allow a verifier 105, such as a law enforcement officer or a merchant, to request the validity-related data item from digital identity document renewal system 103 for the digital identity document that the verifier 105 is inspecting, for example, if the digital identity document under inspection does not have such a validity-related data item attached or associated, or the associated validity-related data item is outdated. User 102 will receive the up-to-date validity-related data item from digital identity document renewal system 103. Verifier 105 may verify again the up-to-date validity-related data item or receive this data item at the same time.

In this embodiment, the digital identity document renewal system 103 sends the up-to-date validity-related data item to the verifier computing device 105 for verification. In this embodiment, the up-to-date validity-related data item received by the verifier 105 is considered to be "associated with" the digital identity document due to the fact that the verifier 105 needs to use the received up-to-date validity-related data item together with the digital identity document. While FIG. 1 illustrates verifier 105 and user 102 connected to each other via network 104, verifier 105 and user 102 may be connected to each via other means, such as via near field communication (NFC), Bluetooth, Bluetooth Low Energy (BLE), Wi-Fi, ultra-Wideband (UWB), IEEE 802.15.4, etc. In this manner, verifier computing device 105 is able to read information (e.g. document reference) on the digital identity document from user computing device 102.

System 100 is not to be limited in scope to any one particular network architecture. System 100 may include any number of issuers 101, user computing devices 102, digital identity document renewal systems 103, networks 104 and verifier computing devices 105.

Figure 2:
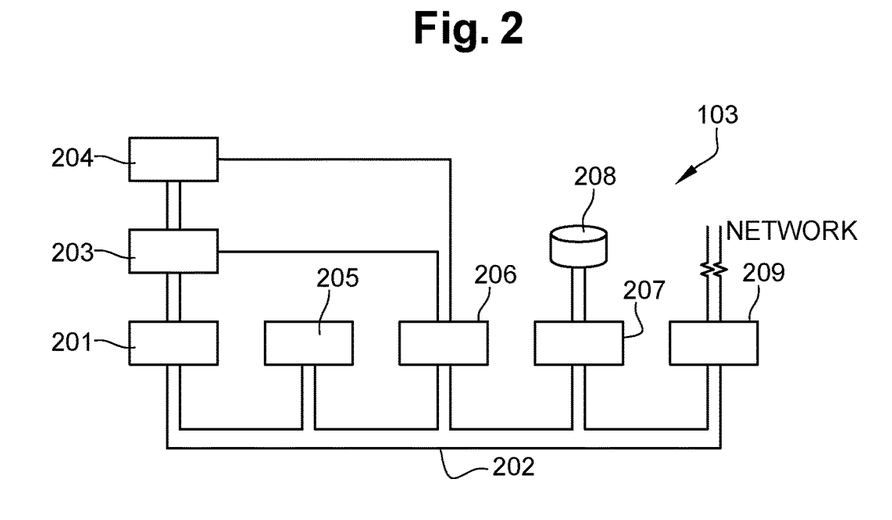
FIG. 2 represents a hardware configuration of a digital identity document renewal system of practicing the principles of the present invention in accordance with an embodiment of the present invention.

Referring now to FIG. 2, FIG. 2 illustrates a hardware configuration of digital identity document renewal system 103 (FIG. 1) which is representative of a hardware environment for practicing the present invention. Referring to FIG. 2, digital identity document renewal system 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for facilitating the renewing of a digital identity document using a validity-related data item as discussed below in connection with FIG. 3.

Referring again to FIG. 2, read-only memory ("ROM") 205 is coupled to system bus 202 and includes a basic input/output system ("BIOS") that controls certain basic functions of digital identity document renewal system 103. Random access memory ("RAM") 206 and disk adapter 207 are also coupled to system bus 202. It should be noted that software components including operating system 203 and application 204 may be loaded into RAM 206, which may be digital identity document renewal system's 103 main memory for execution. Disk adapter 207 may be an integrated drive electronics ("IDE") adapter that communicates with a disk unit 208, e.g., disk drive, or any disk adapters according to the current standard available in the market. It is noted that the program for facilitating the renewing of digital identity documents using a validity-related data item, as discussed below in connection with FIG. 3 may reside in disk unit 208 or in application 204.

Digital identity document renewal system 103 may further include a communications adapter 209 coupled to bus 202. Communications adapter 209 interconnects bus 202 with an outside network (e.g., network 104 of FIG. 1) thereby enabling digital identity document renewal system 103 to communicate with other devices (e.g., issuer 101, user computing device 102 and verifier computing device 105 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
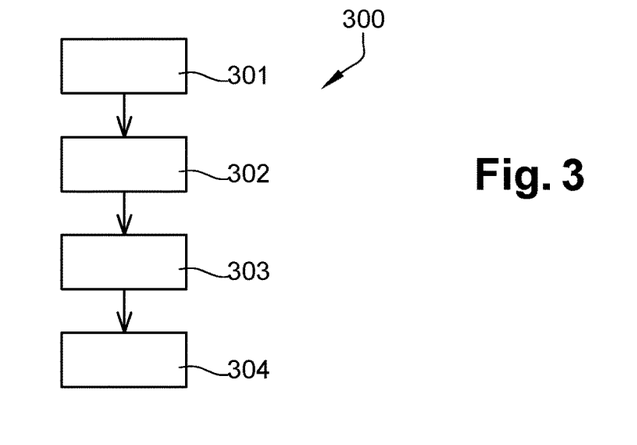
FIG. 3 illustrates a flowchart of a method for facilitating the renewing of digital identity documents in accordance with an embodiment of the present invention.

As stated above, FIG. 3 is a flowchart of a method 300 for creating an up-to-date validity-related data item upon which a digital identity document is renewed in accordance with an embodiment of the present invention.

Referring to FIG. 3, in conjunction with FIGS. 1-2, in step 301, digital identity document renewal system 103 receives request for renewing a digital identity document (e.g., a driver's license, a fishing license, a hunting license, a passport, a health insurance card, a firearm owner's identification card, a boating license, a commercial driver's license, etc.) from, for example, user computing device 102 (e.g., via a smart phone/smart car/smart watch of the holder of the digital identity document), issuer 101 (e.g., via an IT system capable of detecting the expiration of digital identity documents), or verifier 105 (e.g., via a computing device of the verifier who has authority to inspect the digital identity document, etc.) The renewing request may contain any types of identifiers (e.g., ID number, barcode, 2D barcode also called Quick Response (or QR) code, etc.) used in the prior art to identify the digital identity document. For example, the user computing device 102 holding the digital identity document detects that the document needs a refresh based on its expiry period, the device may request a new validity-related data item (e.g., freshness token, expiration-related data group) for the specified document from digital identity document renewal system 103 (e.g., based on an renewal service provider's URL included in the digital identity document). Still for example, the request may be sent by issuer 101 when detecting the expiration of the digital identity document, or by verifier 105 when inspecting the digital identity document.

In step 302, digital identity document renewal system 103 checks whether the digital identity document can be renewed (e.g., whether the digital identity document is revoked). Digital identity document renewal system 103 may perform this check based on data stored in any kinds of secure servers/databases used in the prior art and accessible by the digital identity document renewal system 103. These secure servers/databases may be managed by issuer 101.

In step 303, digital identity document renewal system 103 creates an up-to-date validity-related data item. This created data item is to be associated with the digital identity document indicated in the renewing request. Furthermore, this created data item is to be inspected by verifier 105 to verify the validity of the associated digital identity document.

In step 304, digital identity document renewal system 103 sends the created up-to-date validity-related data item to user 102 (e.g., the holder of the digital identity document), issuer 101, or verifier 105. A validity-related data item previously associated with the digital identity document may then be replaced by the up-to-date validity-related data item at the user's side (e.g., in a computing device of the holder of the digital identity document), or in a computing device of issuer 101. Thus, the digital identity document is allowed to be renewed at the user's side.

Additionally, the up-to-date validity-related data item may be a data item (e.g., freshness token) that is suitable to exist outside the digital identity document. In other words, this data item is not a data component of the digital identity document. The created up-to-date validity-related data item may include a creation date of the up-to-date validity-related data item. If this data item is created upon request of verifier 105, then the creation date is the date on which verifier 105 verifies the digital identity document. Correspondingly, a new entry such as a renewing policy (e.g., a predetermined duration, a predetermined frequency, etc.) may be added in the logical data structure (or LDS) of the digital identity document by issuer 101 during the issuing of the digital identity document. The creation date of the up-to-date validity-related data item and the renewing policy are to be inspected by verifier 105 in order to determine whether the digital identity document is outdated. For example, if the date on which verifier 105 inspects the digital identity document is later than the creation date of the validity-related data item plus the predetermined duration, verifier 105 may determine that the digital identity document is outdated. By using such a validity-related data item, the present invention enables the digital identity document renewal system 103 to create the validity-related data item more efficiently thanks to the simple content (creation date) included in the data item. This solution also allows to enhance the trust in the up-to-date validity-related data item thanks to the renewing policy recognized by issuer 101. In a variant, simple expiration-related information (e.g., expire date) of the validity-related data item may be used instead of the creation date and the renewing policy to allow a simpler and lighter solution that does not require modifying the data structures of the existing digital identity documents. It is noted that in this example, the digital identity document as such held by user 102 is in fact unmodified. It is considered as renewed due to the fact that the associated validity-related data item (e.g., freshness token used together therewith) is renewed.

Additionally, a certificate or an identifier of the creator (e.g. digital identity document renewal system 103) of the validity-related data item (e.g. freshness token) may be provided by digital identity document renewal system 103 when creating the up-to-date validity-related data item. Correspondingly, a new entry such as a certificate or an identifier to an allowed creator (e.g., digital identity document renewal system 103) of the validity-related data item may be added in the LDS of the digital identity document by issuer 101 when issuing the digital identity document. In this manner, the present invention allows trusted parties other than issuer 101 to provide the renewing service while guarantying that only authorized parties should create the validity-related data item, and thus enhances the reliability and flexibility of the renewing mechanism.

In a variant, the validity-related data item (e.g. freshness token) comprises a digital signature issued by a Certificate Authority (e.g., the root or a sub CA controlled by the issuer 101) by signing a certificate or an identifier of the creator (e.g. digital identity document renewal system 103) of the validity-related data item. Correspondingly, a digital signature of a certificate or an identifier of an allowed creator issued by the Certificate Authority may be added in the LDS of the digital identity document by issuer 101 when issuing the digital identity document. In this way, the present invention enhances the authentication and integrity of the certificate or the identification of the creator (e.g. digital identity document renewal system 103) of the validity-related data item.

Additionally, data (e.g. the creation date, the certificate of creator, etc.) included in the up-to-date validity-related data item is signed by the creator (e.g. digital identity document renewal system 103) of the data item. The data signature is to be verified by a device of the requestor, such as user 102, issuer 101, verifier 105, when he/she receives the up-to-date validity-related data item from digital identity document renewal system 103. In this manner, the present invention allows to guarantee that the validity-related data item was created by a known creator (e.g. digital identity document renewal system 103), and that the validity-related data item was not altered in transit. Thus, the present invention enhances the authentication of the creator of the validity-related data item, and allows low coupling between initial issued digital identity document and possible entities playing role 103, as well as extending ecosystem flexibility.

Alternatively, the up-to-date validity-related data item may be a data item (e.g., expiration-related data group) that is suitable to exist inside the digital identity document. In other words, this data item may be a data component of the digital identity document. Digital identity document renewal system 103 may provide up-to-date expiration information of the digital identity document when creating the up-to-date validity-related data item. The up-to-date expiration-related data group may include, but not limited to, for example, a Data Group 1 (DG1) (containing Date of Expiry) according to the International Organization for Standardization (or ISO) Driver's License standard draft; a DG31 (containing Time of last update), a DG32 (containing Mobile Driver's License (or mDL) data validity date), and a DG33 (containing Expected next update date) according to the ISO Digital Driver's License standard draft. The up-to-date expiration-related data group is to be read by verifier 105 to determine whether the associated digital identity document has expired. By using such an up-to-date validity-related data item (e.g., expiration-related data group), the present invention enables to refresh only some of the data components (e.g. expiration-related data groups, derived values of expiration-related data groups such as hashes, digital signatures) of the digital identity documents. Thus, the present invention allows a lightweight renewing mechanism which is compatible with any existing digital identity documents because it is unnecessary to modify the existing data structures of the digital identity documents.

Additionally, the number of the up-to-date validity-related data items (e.g., expiration-related data group) created by digital identity document renewal system 103 is more than one, each validity-related data item comprising expiration-related information. For example, for a digital driver's license according to the ISO Digital Driver's License standard draft, three expiration-related data groups may be created by digital identity document renewal system 103, such as DG31, DG32, and DG33, as mentioned above.

Additionally, digital identity document renewal system 103 may keep (e.g., memorize) derived values (e.g., hashes) of data components of the digital identity document comprising a derived value of expiration-related data group. This may occur in a case where this system 103 is adapted to issue digital identity documents. When creating the up-to-date validity-related data item (e.g., expiration-related data group), renewal system 103 calculates a derived value (e.g., hash value) of the up-to-date validity-related data item by using a derivation function (e.g., Secure Hash Algorithm (SHA), Rivest—Shamir—Adleman (or RSA), Elliptic Curve Digital Signature Algorithm (or ECDSA)). Digital identity document renewal system 103 replaces the kept derived value of expiration-related data group with the calculated derived value of the updated expiration-related data group. Then renewal system 103 signs the freshed derived value and the other kept derived values as a signed data object (SOD), and sends the SOD to user computing device 102. User computing device 102 replaces a previous SOD of the digital identity document with the received SOD. In this manner, the present invention fits the lightweight renewal mechanism to those existing digital identity document standards (e.g., ISO Digital Driver's License, ISO Driver's License) which require SODs as data components of the digital identity documents. By replacing only the derived value of the updated expiration-related data group, the present invention enables to maximize the privacy protection for the holders of the digital identity documents because it is unnecessary to obtain (or keep) personal data (e.g., data groups related to the holder's privacy information) to renew the digital identity documents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating a renewing of a digital identity document, the method comprising the following steps of:
   receiving by a renewal system a request for renewing a digital identity document from a device of a user of said digital identity document or a device of a verifier needing to inspect said digital identity document, wherein the renewal system is an entity performing a renewing process independently of an issuing process by independently creating or renewing a validity-related data item which is suitable to be associated with the digital identity document at the user's side without re-issuing or regenerating the whole digital identity document at the issuer, wherein the renewal system is an entity separate from an issuer of the digital identity document;
   generating by said renewal system a determination of whether said digital identity document can be renewed;
   when the determination is positive, creating by said renewal system an up-to-date validity-related data item to be associated with said digital identity document and to be inspected by a verifier when a validity of said digital identity document must be assessed, wherein the up-to-date validity-related data item is a data item that is suitable to exist outside the digital identity document;
   generating by said renewal system a hash of the validity-related data item;
   sending by said renewal system said up-to-date validity-related data item directly to the device of the user of said digital identity document, wherein the validity-related data item is signed with the hash generated by the renewal system;
   receiving, directly from the renewal system, by the device of the user of said digital identity document, said up-to-date validity-related data item from said renewal system; and
   after validating by the device of the user of said digital identity document that the hash created by the renewal system corresponds with a certificate of the renewal system, replacing, by said device of the user, the validity-related data item previously associated with said digital identity document with said up-to-date validity-related data item at the user's side.

2. The method according to claim 1, wherein said validity-related data item is a metadata pertaining to said digital identity document that is separate from a data contained by the digital identity document.

3. The method according to claim 2, the method further comprising:
   including a creation date of said up-to-date validity-related data item in said up-to-date validity-related data item,
   wherein said digital identity document comprises a renewing policy, and wherein said creation date and said renewing policy are suitable to be inspected by said verifier in order to determine whether said digital identity document is outdated.

4. The method according to claim 2, wherein the validity-related data item is a freshness token.

5. The method according to claim 2, the method further comprising:
   Providing an up-to-date expiration information of said up-to-date validity-related data item in said up-to-date validity-related data item.

6. The method according to claim 5, wherein the method further comprises:
   providing a certificate or an identifier of a creator of said up-to-date validity-related data item in said up-to-date validity-related data item,
   wherein said digital identity document comprises a certificate or an identifier to an allowed creator of said up-to-date validity-related data item.

7. The method according to claim 6, wherein said up-to-date validity-related data item comprises a digital signature of a Certificate Authority signing a certificate or an identifier of the creator of said up-to-date validity-related data item, and said digital identity document comprises a digital signature of said Certificate Authority signing a certificate or an identifier to the allowed creator of said up-to-date validity-related data item.

8. The method according to claim 6, wherein data included in said up-to-date validity-related data item is signed by the allowed creator of said up-to-date validity-related data item.

9. The method according to claim 7, wherein, when said request is received from said verifier, said up-to-date validity-related data item is sent to a device of said verifier.

10. The method according to claim 1, wherein said up-to-date validity-related data item is a data that is suitable to exist inside said digital identity document.

11. The method according to claim 10, the method further comprising:
providing up-to-date expiration information of said digital identity document in said up-to-date validity-related data item.

12. The method according to claim 11, wherein the validity-related data item comprises a plurality of validity-related data items, with each validity-related data item of the plurality of validity-related data items comprising an expiration-related information.

13. The method according to claim 12, wherein the method further comprises:
calculating a calculated derived value of the up-to-date validity-related data item by using a derivation function;
signing the calculated derived value and derived values of other data components of the digital identity document as a signed data object; and
sending said signed data object to the user.

14. The method according to claim 13, wherein, when said request is received from an issuer of said digital identity document, said up-to-date validity-related data item is sent to a device of said issuer so that the validity-related data item previously associated with said digital identity document can be replaced by said up-to-date validity-related data item by the issuer.

15. A system for facilitating a renewing of a digital identity document, comprising:
a renewal system, wherein the renewal system is an entity performing a renewing process independently of an issuing process by independently creating or renewing a validity-related data item which is suitable to be associated with the digital identity document at the user's side without re-issuing or regenerating the whole digital identity document at the issuer, wherein the renewal system is an entity separate from an issuer of the digital identity document, configured to:
receive a request for renewing a digital identity document from a device of a user of said digital identity document or a device of a verifier needing to inspect said digital identity document;
generate a determination of whether said digital identity document can be renewed;
when the determination is positive, create an up-to-date validity-related data item to be associated with said digital identity document and to be inspected by a verifier when a validity of said digital identity document must be assessed, wherein the up-to-date validity-related data item is a data item that is suitable to exist outside the digital identity document;
generate a hash of the validity-related data item;
send said up-to-date validity-related data item directly to the device of the user of said digital identity document, wherein the validity-related data item is signed with the hash generated by the renewal system;
the device of the user of said digital identity document configured to:
receive, directly from the renewal system, said up-to-date validity-related data item from said renewal system;
after validating that the hash created by the renewal system corresponds with a certificate of the renewal system, replace the validity-related data item previously associated with said digital identity document with said up-to-date validity-related data item at the user's side.

* * * * *